United States Patent [19]

Roffia et al.

[11] Patent Number: 4,745,221

[45] Date of Patent: May 17, 1988

[54] CATALYTIC PROCESS FOR PREPARING CYCLOHEXANONE-OXIME

[75] Inventors: Paolo Roffia, Saronno; Mario Padovan, Milan; Enrico Moretti, Arese; Giordano De Alberti, Besnate, all of Italy

[73] Assignee: Montedipe S.p.A., Milan, Italy

[21] Appl. No.: 882,718

[22] Filed: Jul. 7, 1986

[30] Foreign Application Priority Data

Jul. 10, 1985 [IT] Italy ................................ 21511 A/85

[51] Int. Cl.$^4$ ............................................ C07C 131/04
[52] U.S. Cl. ................................................ 564/267
[58] Field of Search .............................. 564/267, 259

[56] References Cited

U.S. PATENT DOCUMENTS 4,061,724 12/1977 Grose et al. ...................... 423/339
4,163,756 8/1979 Armor ................................ 564/267

Primary Examiner—James H. Reamer
Attorney, Agent, or Firm—Stevens, Davis, Miller & Mosher

[57] ABSTRACT

A catalytic process for preparing cyclohexanone-oxime, by reacting cyclohexanone with $NH_3$ and $H_2O_2$ in the liquid phase, characterized in that the catalyst substantially consists of a highly crystalline substance, containing $SiO_2$ and having a zeolitic structure.

6 Claims, No Drawings

CATALYTIC PROCESS FOR PREPARING CYCLOHEXANONE-OXIME

BACKGROUND OF THE INVENTION

German Pat. No. 1 245 371 teaches how to obtain cyclohexanone-oxime by catalytic reaction, in the liquid phase, of cyclohexanone with ammonia and hydrogen peroxide, at 5°–40° C., according to suitable ratios of the reactants and in the presence of a catalyst consisting of phospho-tungstic acid or of similar compounds. A drawback of this method, however, resides in that this type of catalyst is difficult to handle, particularly during the separation of the product from the catalyst. It was now found that it is possible to obtain the same high yields by using a quite different, and easier to be used, catalyst, which permits a less complicated development of the process in all its steps.

DISCLOSURE OF THE INVENTION

In a wide form, the invention concerns a catalytic process for preparing cyclohexanone-oxime by reacting cyclohexanone with $NH_3$ and $H_2O_2$ in the liquid phase, characterized in that the catalyst is substantially consisting of a highly crystalline, $SiO_2$-containing substance having a zeolitic structure, and in particular of a titanium-silicalite, optionally in admixture with an inert binder, the reaction temperature being from 25° to 100° C. and preferably from 40° to 90° C.; tests carried out at 15° C. have provided little satisfactory results. Titanium-silicalites are known compounds, described, for example, in British Pat. Nos. 2 024 790 and 2 071 071. A pressure higher than the atmospheric pressure promotes the development of the reaction.

Other substances of zeolitic nature, which can catalyze this highly useful reaction are, first of all, the various types of silicalite, among which, e.g., silicalite I (see, for example, U.S. Pat. No. 4,061,724), silicalite II, zirconium-silicalites and hafnium-silicalites. Another class of analogous catalysts are the metal-silicates, for example borosilicates (boralites), beryllo-silicates, chromo-silicates, vanadium-silicates, zirconium-silicates, gallium-silicates and ferro-silicates, which are described in part in British Pat. No. 2 024 790. A third class of catalysts, always of analogous type, consists of the known aluminium-silicates, universally known as "zeolites", first of all the zeolites of type Y, the zeolites ZSM5, the zeolites of type ZSM 11 and the other zeolites ZSM described in European Pat. Nos. 129 239, 141 514 and 143 642, as well as the zeolites MB 28 described in European Pat. No. 21445; a few of these zeolites were already successfully utilized in the aminoximation of cyclohexanone in the gas phase with $NH_3$ and air.

The synthesis can be carried out either continuously or discontinuously, provided reactors are used, whose surfaces are consistent with hydrogen peroxide. When the synthesis is carried out in batch, it is advisable to use from 0.1 to 50 parts by weight (preferably from 1 to 20 parts by weight) of pure catalyst (binder excluded) for 100 parts by weight of cyclohexanone; if it is performed in continuous, it is suggested to employ a space velocity from 0.1 to 100 kg/h of cyclohexanone ($C_6H_{10}O$) per kg of catalyst. The $H_2O_2:C_6H_{10}O$ molar ratio shall generally range from 0.5 to 2.5 and preferably from 1 to 1.5, where $H_2O_2$ means 100%-pure hydrogen peroxide (i.e.: dilution water excluded). Water ($H_2O$) is the most suitable liquid vehicle for this synthesis, however it is possible also to use organic water-soluble solvents, capable of dissolving both pure ammonia and its water solutions; there may be cited, for example, methanol, ethanol, propanol, isopropanol, butanol, isobutanol, tertiary butyl alcohol, and mixtures thereof, but solvents with carbonyl functions, such as aldehydes and ketones, shall be thoroughly excluded.

The reaction water, which forms according to the equation:

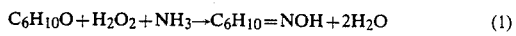

$$C_6H_{10}O + H_2O_2 + NH_3 \rightarrow C_6H_{10}=NOH + 2H_2O \quad (1)$$

gradually increases the amount of liquid vehicle as the conversion to oxime proceeds; during the reaction, also considerable amounts of peroxy-di-cyclohexyl-amine, of formula:

(II)

are formed.

Ammonia has to be added always before hydrogen peroxide(and in excess; $NH_3:C_6H_{10}O \geq 1$, preferably $\geq 1.5$ moles/mole), otherwise undesired side-reactions occur. At the end of the reaction, the cyclohexanone-oxime can be separated by different methods, for example through extraction with suitable solvents (such as benzene, toluene and the same cyclohexanone used for the synthesis), whereby a hydrophobic organic phase and an aqueous phase are formed. Cyclohexanone-oxime and unreacted cyclohexanone form the organic layer; the aqueous layer, which contains the excess of $NH_3$ as well as traces of cyclohexanone and of oxime, can be usefully recycled to the reaction section (ammoximation section). The following examples illustrate the invention, without being however a limitation thereof.

EXAMPLE 1

A glass reactor, equipped with a stirrer and a heating jacket, was first blanketed with an inert gas (nitrogen). Subsequently there were charged 1.5 g of a catalyst consisting of a finely ground powder of titanium-silicalite containing 3.85% by weight of titanium dioxide (highly crystalline; average diameter of the particles $\leq 5$ μm). 50 cm³ of a 32% (b.w.) aqueous solution of ammonia were added to the catalyst; the whole was stirred and 9.5 g of cyclohexanone were charged; a three-phase system (solid-aqueous-organic) was formed and it was maintained homogeneous by means of intense stirring. Heating was started by conveying a liquid, at 60° C., into the jacket; simultaneously a 32% (b.w.) aqueous solution of hydrogen peroxide was fed to the reactor by means of a metering pump. After 15 minutes, the temperature in the reactor reached 60° C., while the pressure rose to a value ranging from 600 to 700 mm/Hg above the atmospheric pressure. The addition of $H_2O_2$ was performed in 3.5 hours, during which time the pressure decreased. The temperature was maintained at 60° C. and stirring was carried on for further 1.5 hours, whereafter the test was stopped and the whole was cooled. The resulting suspension was additioned with 50 cm³ of toluene and stirred for a few minutes; the aqueous phase and the organic phase were then separated from the catalyst by filtration. The liquid phases were separated in a separatory funnel and the aqueous phase was extracted with two portions of toluene of 30 cm³ each. The toluene solutions were joined and analyzed. The analysis revealed a cyclohexanone conversion of 95% and a selectivity to cyclohexanoneoxime of 79.45%; the selectivity of hydrogen TABLE 1 (a)

| | PARAMETERS | | | | | PRODUCTS | | | | | | | |
|---|---|---|---|---|---|---|---|---|---|---|---|---|---|
| | | | | | | Liquid phase | | Gas composition | | | | | |
| | $C_6H_{10}O$ | $H_2O_2$ | | Time | P (mmHg) | aqueous | organic | $N_2O$ | $O_2$ | Conversion (%) | | Selectivity (%) | |
| Ex. | (g) | at 32% | T (°C.) | (h) | (b) | (g) | (g) | (% vol.) | (% vol.) | $C_6H_{10}O$ | $H_2O_2$ | $C_6H_{10}O$ | $H_2O_2$ |
| 1 | 9.50 | 11.7 | 60 | 3½ | 75 | 52.0 | 127 | 17.22 | 23.14 | 95.35 | 91.87 | 79.45 | 68.73 |
| 2 | 9.50 | 11.55 | 40 | " | negative | 50.8 | 114.5 | — | — | 90.37 | 79.20 | 30.97 | 25.74 |
| 3 | 9.50 | 11.7 | 25 | " | 0 | 57.0 | 120 | 0.335 | 95.49 | 82.56 | 98.13 | 20.53 | 15.37 |
| 4 (*) | 9.55 | 11.8 | 15 | 3¾ | 0 | 71.3 | 91 | 0.094 | 69.07 | 47.79 | 95.48 | 16.70 | 7.22 |

(*) Comparative test.
(a) In all the tests, 50 cm³ of aqueous NH₃ were added and 1.5 g of Ti—silicalite were used.
(b) Above atmospheric pressure.
(c) Selectivity to oxime.
Note:
Nitrogen protoxide derives from the decomposition of hydroxylamine, which forms in consequence of a parallel reaction.

peroxide to oxime was 68.7%. About 15% of the starting cyclohexanone was found, at the end, in the form of peroxy-dicyclohexyl-amine (see formula II above).

EXAMPLES 2 AND 3

Example 1 was repeated, varying temperature and pressure; data and results (see Table 1) prove that the selectivity of the conversion $H_2O_2 \rightarrow$ oxime is very adversely affected when it is operated under vacuum.

EXAMPLE 4

(comparative test)

Example 1 was repeated, bringing the pressure (gauge) to zero and considerably lowering the temperature (down to 15° C.). The unsatisfactory results (see Table 1) prove that it is disadvantageous to excessively reduce the thermal level of the ammoximation.

EXAMPLE 5

Example 1 was repeated, replacing titanium silicalate by a zirconite (zirconium-silicalite); analogous results were obtained.

EXAMPLE 6

Example 1 was repeated, replacing titanium-silicalite by a boralite (boron-silicate); analogous results were obtained.

What is claimed is:

1. A process for the manufacture of cyclohexanoneoxime, which comprises reacting cyclohexanone with ammonia and hydrogen peroxide in the liquid phase at a temperature ranging from 25° to 100° C. at a pressure equal to or higher than atmospheric pressure in the presence of a catalyst comprising titanium-silicalite.

2. The process according to claim 1, wherein the titanium-silicalite catalyst is present together with a binder.

3. The process according to claim 1, wherein the reaction is effected continuously at a space velocity ranging from 0.1 to 100 kg/h of cyclohexane per kg of the titanium-silicalite and wherein the hydrogen peroxide to cyclohexane molar ration ranges from 0.5 to 2.5.

4. The process according to claim 1, wherein the molar ratio of ammonia to cyclohexanone is equal to or greater than 1 and the temperature of reaction is from 40° to 90° C.

5. The process according to claim 4, wherein the molar ratio of ammonia to cyclohexanone is greater than 1.5.

6. The process according to claim 1, wherein a portion of the titanium-silicalite is replaced by zirconium-silicalite.

* * * * *